Feb. 1, 1966  B. BENDER  3,231,983
WHEEL ALIGNING TURNTABLE
Filed Sept. 6, 1963  2 Sheets-Sheet 1
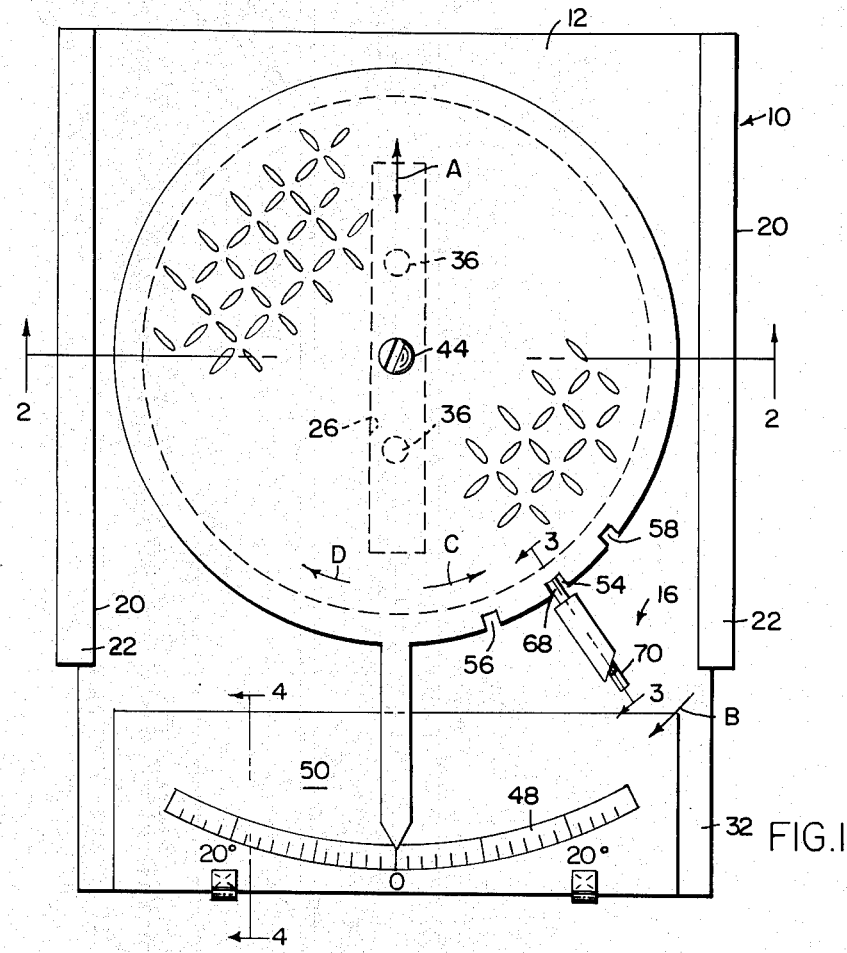
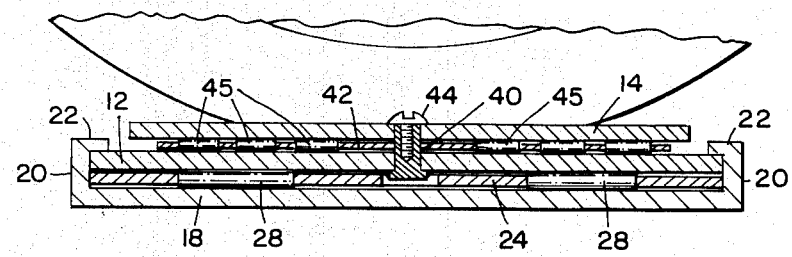
FIG.2
INVENTOR.
BAXTER BENDER.
BY
Ezekiel Wolf, Wolf + Greenfield
ATTORNEYS

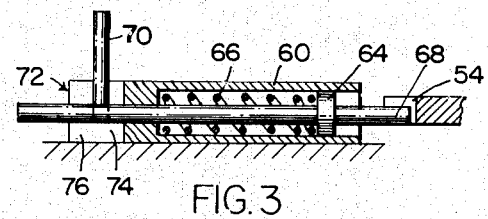
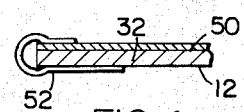
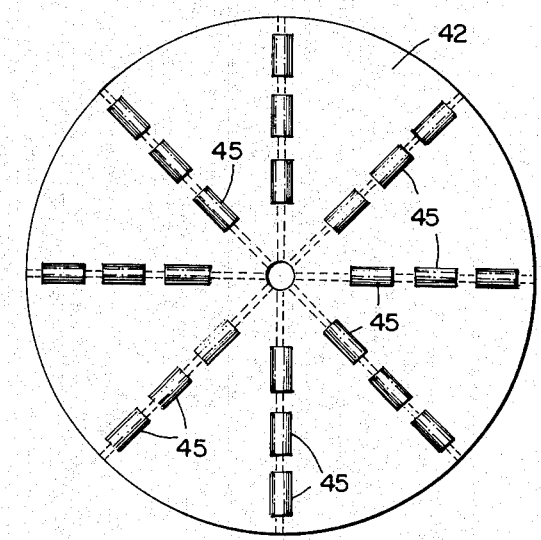
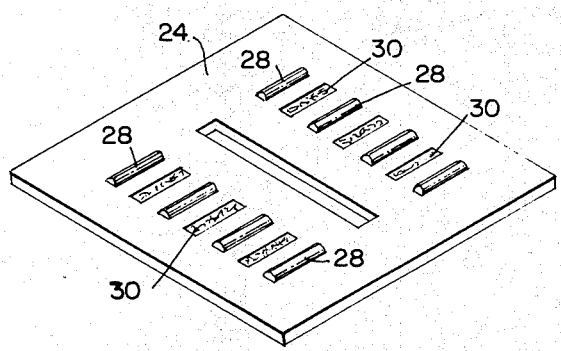

United States Patent Office 3,231,983
Patented Feb. 1, 1966

3,231,983
WHEEL ALIGNING TURNTABLE
Baxter Bender, P.O. Box 1, Mineola, N.Y.
Filed Sept. 6, 1963, Ser. No. 307,234
1 Claim. (Cl. 33—203)

This invention relates to the alignment of vehicle wheels and more particularly comprises a new and improved turntable for supporting the vehicle wheels while performing certain wheel aligning functions.

Vehicle wheel turntables are particularly useful when measuring caster which is the backward or forward tilt from the vertical of the king pin of the wheel. Most commonly, caster is measured with the aid of a gage of the type shown in Bender et al. Patent No. 2,645,860, issued July 21, 1953. Such gages have magnetic coupling devices so that the gages may be attached to the wheel mounting assembly, and the gages use as a reference surface the machined face of the wheel hub. Caster is measured by turning the wheel first in one direction 20° from the center or straight position and then turning the wheel through an arc of 40° in the opposite direction so that the wheel is turned approximately 20° to the other side of the straight position. Certain manipulations are required of the gage such as the adjustment of the spirit level when the wheel is displaced initially 20° from center and it is also necessary to read the gage after the wheel has swung back 40°, and it is extremely difficult for the automobile mechanic to hold the wheel steady in the displaced positions and perform these functions. Most of the turntables which are now available include a scale for indicating to the mechanic the displacement of the wheel, but no means are provided to retain the wheel in the displaced position to enable the mechanic, without physical strain to perform the necessary functions.

One important object of this invention is to provide a latching device for vehicle wheel turntables which automatically releasably holds the wheels in the displaced position where initial gage adjustment is made and which also automatically releasably holds the wheels in the other extreme position in which the gage is read.

To accomplish this and other objects this invention includes among its features a first plate on which is mounted for rotation a top plate that supports the vehicle wheel. A sliding bolt-type latch is mounted on the first plate and is biased to a position wherein it engages the periphery of the top plate. A first notch is provided in the top plate periphery, which is engaged by the bolt when the top plate is in the center position, that is, with the wheels straight. Second and third notches are provided on each side of the first notch in the periphery of the top plate, which notches are spaced equidistantly from the first notch. When the top plate is rotated so that either the second or third notch is aligned with the bolt, the bolt engages the notch to prevent the top plate from rotating. A convenient handle is provided for the bolt to allow it to be manually withdrawn.

These and other objects and features of this invention will be better understood and appreciated from the following detailed description of one embodiment thereof, selected for purposes of illustration and shown in the accompanying drawing, in which:

FIG. 1 is a top view of a vehicle wheel turntable constructed in accordance with this invention;

FIGS. 2–4 are cross-sectional views taken along the corresponding section lines in FIG. 1;

FIG. 5 is a plan view of a circular race forming part of the turntable; and

FIG. 6 is a perspective view of a rectangular race forming part of the turntable.

The embodiment of this invention shown in the drawings includes a base channel 10, a center plate 12 movable translationally in the channel 10, a rotatably mounted top plate 14 and a latching device 16.

The channel base 10 is composed of a bottom plate 18 which is adapted to rest upon the floor or the wheel track of an automobile rack, and upstanding flanges 20 along its sides having inwardly extending shoulders 22 at their top. Disposed immediately on top of the bottom plate 18 is a rectangular race 24 shown in detail in FIG. 6. The race is provided with an elongated slot 26 which extends in the direction of motion of the center plate 12, and along each side of the slot are alternate roller bearings 28 and felt lubricating pads 30. The pads may be packed with a suitable lubricant to enable the center plate 12 to move freely back and forth between the flanges 20 as suggested by arrow A. The center plate 12 is appreciably longer than the channel 10, and in FIG. 1 the end 32 of the plate is shown extending beyond the edges 34 of the flanges 20. The movement of the center plate 12 is limited by the stop pins 36 secured to the lower surface of the center plate 12 and which are disposed within the elongated slot 26 in the race 24. The pins are positioned to engage the ends of the slot 26 when the plate 12 moves a selected distance in either direction to prevent further movement of the center plate with respect to the race. The stops could conveniently be mounted on the upper surface of the bottom plate 18 of the channel 10 and extend upwardly into the slot 26 to perform the same function.

A pin 40 extends through and is welded flush with the bottom surface of the center plate 12 and serves as the axle for rotation of the top plate 14 and circular race 42 beneath the top plate 14 and above the center plate 12. The pin 40 extends upwardly through the aligned openings provided in the circular race 42 and the top plate 14, and a cap screw 44 threaded into the pin 40 retains the assembly together.

The circular race 44 as shown in FIG. 5 is provided with a number of radially extending rows of roller bearings 45 with the axes of the roller bearings also extending in a radial direction. Thus, very limited frictional contact exists to prevent rotation of the top plate 14 on the center plate 12, and consequently with a minimum of force a wheel supported on the top plate may be turned about the axis of the pin 40.

In FIG. 1, the top plate 14 is shown to carry an index pointer 46 which cooperates with a scale 48 imprinted on a plate 50. The plate 50 is clipped onto the end 32 of the center plate 12 by the springs 52 so that the plate 50 may be removed at will. This is desirable for it enables the mechanic to remove the plate 50 and step on the end 32 of center plate 12 to steady the assembly without marring or scuffing the scale on the plate 50.

It is evident in FIG. 1 that the top plate 14 is free to turn through an arc in excess of 20° on each side of the center position shown, and the scale on the plate 50 can indicate the actual deflection. In that figure with the index pointer 46 on the zero deflection position the latching device 16 is shown to register with notch 54 cut in the periphery of the top plate 14. Two additional notches 56 and 58 are shown disposed on opposite sides of the notch 54 and each are displaced 20° from that notch.

The latching device 16 is shown in detail in FIG. 3. It includes a sleeve 60 welded or otherwise secured to the upper surface of the center plate 12 and through which bolt 62 extends. The bolt carries a collar 54 which retains a spring 66 within the sleeve surrounding the bolt. The spring serves to urge the bolt 62 radially inwardly toward the top plate 14 so that its end 68 engages the periphery of the top plate. A slender actuating finger 70 is secured to the end of the bolt outside the sleeve.

The outer end 72 of the sleeve is provided with a cam surface which operates with the finger grip 70 to withdraw end 68 of the bolt from the direction of the top plate 14 when the finger 70 is turned. It is evident from an inspection of FIG. 1 that when the finger 70 is moved in the direction of arrow B the bolt 62 moves radially outward in the sleeve 60 and the end 68 moves out of the notch 54. When the finger 70 is released the spring 66 overcomes the cam 74 and pushes the bolt 62 radially inwardly so that it engages the notch with which it is aligned. To hold the bolt 62 in the withdrawn position a catch 76 is provided at the bottom of the cam, in which the finger 70 may lodge. When lodged in the catch 76 the spring cannot cause the finger 70 to ride upwardly on the cam surface 74 to move the end 68 of the bolt radially inwardly toward the top plate.

From the foregoing description it is evident that the turntable of this invention facilitates the task of wheel alignment. With the front wheels of the automobile disposed on a pair of identical turntables of the type shown in the drawing and oriented in the direction suggested in FIG. 2, the mechanic may very quickly align the wheels in a straightforward direction by aligning the pointer 46 with the zero point on the scale and then allow the latching device 16 to engage the notch 54. In this position, with the aid of a camber and caster gage of the type disclosed in the Bender et al. patent, supra, a mechanic can quickly check the camber of each wheel. Then by turning the left wheel of the automobile 20° left of center in a direction of arrow C the latching device 16 will engage the notch 56 and hold the wheel in that position while the level of the gage is adjusted. When this is done the operator may release the latching device by turning the finger 70 in the direction of arrow B to withdraw the end 68 of the bolt from the notch 56 and turn the top plate 12 40° in the direction of arrow D so that the end 68 of the bolt engages the notch 58. When this is done the mechanic can make the caster reading on the gage. Merely by repeating the same operation on the other wheel of the vehicle the camber and caster of the wheels may be quickly determined. It is evident that this may be done without strain on the part of the mechanic and a more accurate check may be made because the wheels of the vehicle are held fast in the desired position by means of the latching device. An operator need not divide his attention between the position of the pointer 46 and the scales on the gage but rather may give full attention to the gage, because the latching device will automatically hold the wheel in the position desired.

From the foregoing description those skilled in the art will appreciate that numerous modifications may be made of this invention without departing from its spirit. Therefore, it is not intended that the breadth of this invention be liimted to the single embodiment illustrtaed and described. Rather, it is intended that the scope of this invention be determined by the appended claim and its equivalents.

What is claimed is:

1. A turnatable for vehicle wheel alignment comprising,
   a base channel,
   a first race slidable within the channel,
   a center plate slidably supported on the first race within the channel,
   a second race rotatably anchored on the center plate for rotation on said plate,
   a top plate rotatably anchored on the second race for rotation relative to the center plate,
   a scale provided on the center plate and a pointer carried by the top plate for indicating the angular relationship of the top plate and center plate,
   three radially extending notches provided in the periphery of the top plate twenty degrees apart,
   and latching means mounted on the center plate,
   said latching means comprising,
   a sleeve fixed to the center plate and aligned radially with the axis of the top plate,
   a bolt slidably mounted in the sleeve and extending beyond each end of the sleeve,
   a spring disposed in the sleeve and engaging the bolt for urging the bolt into engagement with the notches in the top plate,
   a cam and follower forming part of the latching means for moving the bolt radially outward with respect to the top plate against the bias of the spring when the bolt is turned in one direction,
   and a catch forming part of the cam for holding the bolt in the extreme radially outward position.

References Cited by the Examiner
UNITED STATES PATENTS

| | | | |
|---|---|---|---|
| 1,989,307 | 1/1935 | Bennett | 33—203.14 |
| 2,155,541 | 4/1939 | Graham et al. | 33—203 |
| 2,208,063 | 7/1940 | Wochner | 33—203 |
| 2,214,166 | 9/1940 | Hertlein. | |
| 2,250,742 | 7/1941 | Bennett | 33—203 |
| 2,503,580 | 4/1950 | Fontaine | 33—203 |

ISAAC LISANN, *Primary Examiner.*

ROBERT L. EVANS, *Examiner.*